(12) United States Patent
Karol

(10) Patent No.: US 8,392,711 B2
(45) Date of Patent: Mar. 5, 2013

(54) STAGED ESTABLISHMENT OF SECURE STRINGS OF SYMBOLS

(75) Inventor: Mark John Karol, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 827 days.

(21) Appl. No.: 12/473,157

(22) Filed: May 27, 2009

(65) Prior Publication Data

US 2010/0306526 A1   Dec. 2, 2010

(51) Int. Cl.
*H04L 9/32* (2006.01)
*H04L 9/00* (2006.01)
*H04K 1/00* (2006.01)

(52) U.S. Cl. ........ 713/171; 713/168; 713/169; 713/170; 380/255; 380/259; 380/260; 380/263; 380/273

(58) Field of Classification Search ............... 380/44, 380/255, 259–60, 28–30, 46, 259–63, 270, 380/273, 277, 278, 286; 713/168–171, 150, 713/176, 177, 180
See application file for complete search history.

(56) References Cited

U.S. PATENT DOCUMENTS

| | | | |
|---|---|---|---|
| 1,889,769 A | 12/1932 | Bausch et al. | |
| 5,751,811 A * | 5/1998 | Magnotti et al. | 380/28 |
| 7,171,552 B1 * | 1/2007 | Bell | 713/150 |
| 7,664,765 B2 * | 2/2010 | Urbanik et al. | 380/28 |
| 7,742,601 B2 * | 6/2010 | Yochim | 380/268 |
| 2003/0091184 A1 | 5/2003 | Chui | |
| 2005/0140964 A1 * | 6/2005 | Eschenauer et al. | 356/10 |
| 2005/0195975 A1 * | 9/2005 | Kawakita | 380/30 |
| 2006/0034456 A1 * | 2/2006 | McGough | 380/30 |
| 2007/0165845 A1 * | 7/2007 | Ye et al. | 380/30 |
| 2008/0025505 A1 * | 1/2008 | Yochim | 380/46 |
| 2008/0037775 A1 * | 2/2008 | Gilman | 380/44 |
| 2008/0044028 A1 | 2/2008 | Sun et al. | |
| 2008/0263269 A1 * | 10/2008 | Kadosh | 711/108 |

FOREIGN PATENT DOCUMENTS

EP   1841121 A1   10/2007

OTHER PUBLICATIONS

Srinivasa et al., "Cominatorial Approach to Key Generation using Multiple Key Spaces for Wireless Sensor Networks", "International Conference on Advanced Computing and Communications 2008XP031411143", Dec. 14, 2008, pp. 279-284, Publisher: IEEE.
Manet, Pascal, "EP Application No. 10158074.4 European Search Report Sep. 9, 2010", , Publisher: EPO, Published in: EP.

* cited by examiner

*Primary Examiner* — Tae Kim

(57) ABSTRACT

A multi-stage technique of establishing a plurality of secure strings of symbols is disclosed. In the first stage, the illustrative embodiment establishes a first-stage string of symbols with each other node. The first-stage strings are chosen from a first, small, key space, which means that they can be established more quickly than a highly secure key from a large key space. The advantage of the first-stage strings is that it enables the user to transmit secure messages more quickly than messages secured with highly secure strings. The disadvantage of the illustrative embodiment is that the first-stage strings are not as secure as strings from a larger key space. This disadvantage is mitigated, however, by the fact that the first-stage strings are only used for a short amount of time—until the second-stage strings are established in the second stage.

20 Claims, 3 Drawing Sheets

STAGED ESTABLISHMENT OF SECURE STRINGS OF SYMBOLS

FIELD OF THE INVENTION

The present invention relates to telecommunications in general, and, more particularly, to cryptography.

BACKGROUND OF THE INVENTION

When two parties communicate via a telecommunications network, it is common for the parties:
i. to encrypt their messages so that they remain secret from eavesdroppers, and
ii. to authenticate the messages so that the receiver is confident who really sent the message.

It is well known in the prior art how to encrypt and authenticate messages using one or more secure strings of symbols. There are many well-known ways of establishing secure strings, but the process of establishing secure strings in the prior art has disadvantages.

SUMMARY OF THE INVENTION

The present invention provides a technique for establishing secure strings of symbols between pairs or groups of nodes in a telecommunications network without some of the costs and disadvantages for doing so in the prior art. These secure strings can then be used to create and transmit a "secure message," which for the purposes of this specification, is defined as a message that is:
i. authenticated, or
ii. encrypted, or
iii. authenticated and encrypted.

When a node in a telecommunications network is turned on, comes on-line, or is re-booted, the node might be required to establish a secure string of symbols with one or more other nodes. Because the process to establish even one highly secure string of symbols is computationally intense, the amount of time required for one node to establish a highly secure string with each of several other nodes can be substantial. The consequence is that a user of the node might be prevented from transmitting a secure message for a long time.

To address this, the illustrative embodiment stages the process of establishing secure strings. In the first stage, the illustrative embodiment establishes a first-stage string of symbols with each other node. The first-stage strings are chosen from a first, small, key space, which means that they can be established more quickly than a highly secure key from a large key space. The advantage of the first-stage strings is that it enables the user to transmit secure messages more quickly than messages secured with highly secure strings. The disadvantage of the illustrative embodiment is that the first-stage strings are not as secure as strings from a larger key space. This disadvantage is mitigated, however, by the fact that the first-stage strings are only used for a short amount of time—until the second-stage strings are established in the second stage.

In the second stage, the illustrative embodiment establishes a second-stage string of symbols with each other node. The second-stage strings are chosen from a second, medium-sized, key space. The advantage of the second-stage strings is that they are more secure than the first-stage strings, albeit not as secure as the third-stage strings established in the third stage. Once the second-stage strings are established, they can be used in place of the first-stage strings.

In the third stage, the illustrative embodiment establishes a third-stage string of symbols with each other node. The third-stage strings are chosen from a third, large-sized, key space. The advantage of the third-stage strings is that they are more secure than the second-stage strings. Once the third-stage strings are established, they can be used in place of the second-stage strings.

The illustrative embodiment comprises: transmitting secure messages at a telecommunications node with a first string of symbols for a first interval from instant $b_1$ to instant $x_1$, wherein the first string of symbols is selected from a first key space having $K_1$ members, where $K_1$ is a natural number; and transmitting secure messages at the telecommunications node with a second string of symbols for a second interval from instant $b_2$ to instant $x_2$, wherein the second string of symbols is selected from a second key space having $K_2$ members, where $K_2$ is a natural number; wherein $b_2 < x_1$; and wherein $$\frac{\ln(K_2)}{(x_2 - b_2)} > \frac{\ln(K_1)}{(x_1 - b_1)}.$$

DETAILED DESCRIPTION

Figure 1:
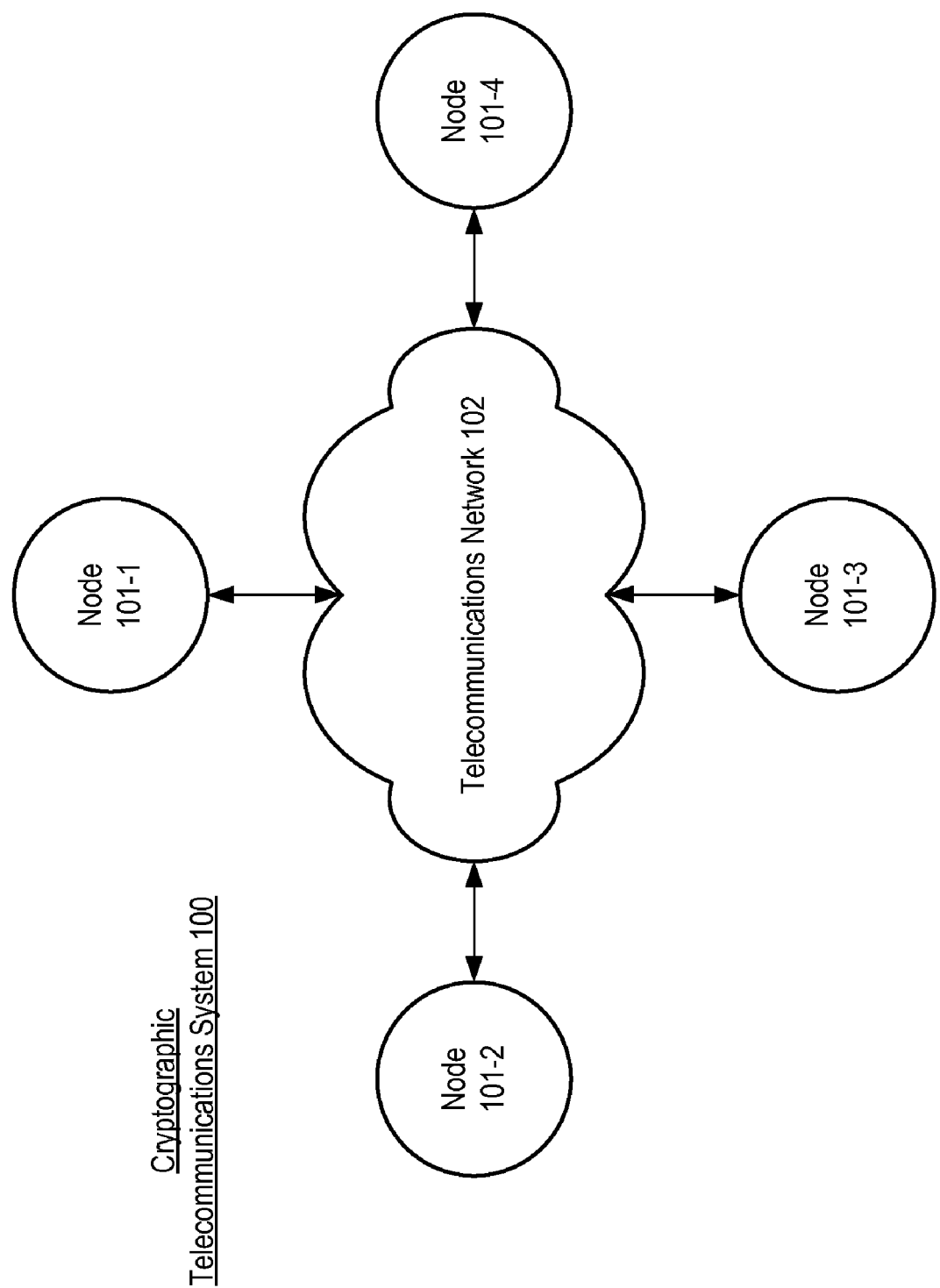
FIG. 1 depicts a schematic diagram of a portion of a typical wireless telecommunications system.

FIG. 1 is a schematic diagram of the salient components of cryptographic telecommunications system 100 in accordance with the illustrated embodiment of the present invention. Cryptographic telecommunications system 100 comprises: telecommunications nodes 101-1 through 101-4 and telecommunications network 102, interconnected as shown.

In accordance with the illustrative embodiment, node 101-4 is a communications hub, and messages between nodes 101-1, 101-2, and 101-3 pass through node 101-4, but it will be clear to those skilled in the art, after reading this disclosure, how to make and use alternative embodiments of the present invention in which any node communicates directly with any other hub (i.e., the nodes communicate on a peer-to-peer basis).

In accordance with the illustrative embodiment, each of nodes 101-1 through 101-3 establishes a series of progressively-more-secure string of symbols with node 101-4 for the purposes of exchanging secure messages with node 101-4.

Although the illustrative embodiment depicts three nodes that establish a series of string of symbols with one other node, it will be clear to those skilled in the art, after reading this disclosure, how to make and use alternative embodiments of the present invention in which any number of nodes establish a series of string of symbols with any number of other nodes.

In accordance with the illustrative embodiment, each of nodes 101-1 through 101-4 uses one series of strings of symbols to exchange secure messages, but it will be clear to those skilled in the art, after reading this disclosure, how to make and use alternative embodiments of the present invention in which one node uses one series of strings of symbols to transmit secure messages to a second node, but the second node uses a second series of strings of symbols to transmit secure messages to the first node.

Node 101-$j$, where $j \in \{1, 2, 3, 4\}$, is hardware and software that provides voice, video, and data capabilities to a user, and that is capable of performing the functionality described below and in the accompanying figures. In accordance with the illustrative embodiment, node 101-$j$ is a wireless terminal that is connected to network 102 via wireline, but it will be clear to those skilled in the art, after reading this disclosure, how to make and use alternative embodiments of the present invention in which node 101-$j$ is connected to network 102 via wireless.

Network 102 is the Internet, but it will be clear to those skilled in the art, after reading this disclosure, how to make and use alternative embodiments of the present invention in which telecommunications network 102 is any network (e.g., the Public Switched Telephone Network, an intranet, an 802.11 network, etc.), or combination of networks, using the same or dissimilar networks and in one or more address spaces.

Figure 2:
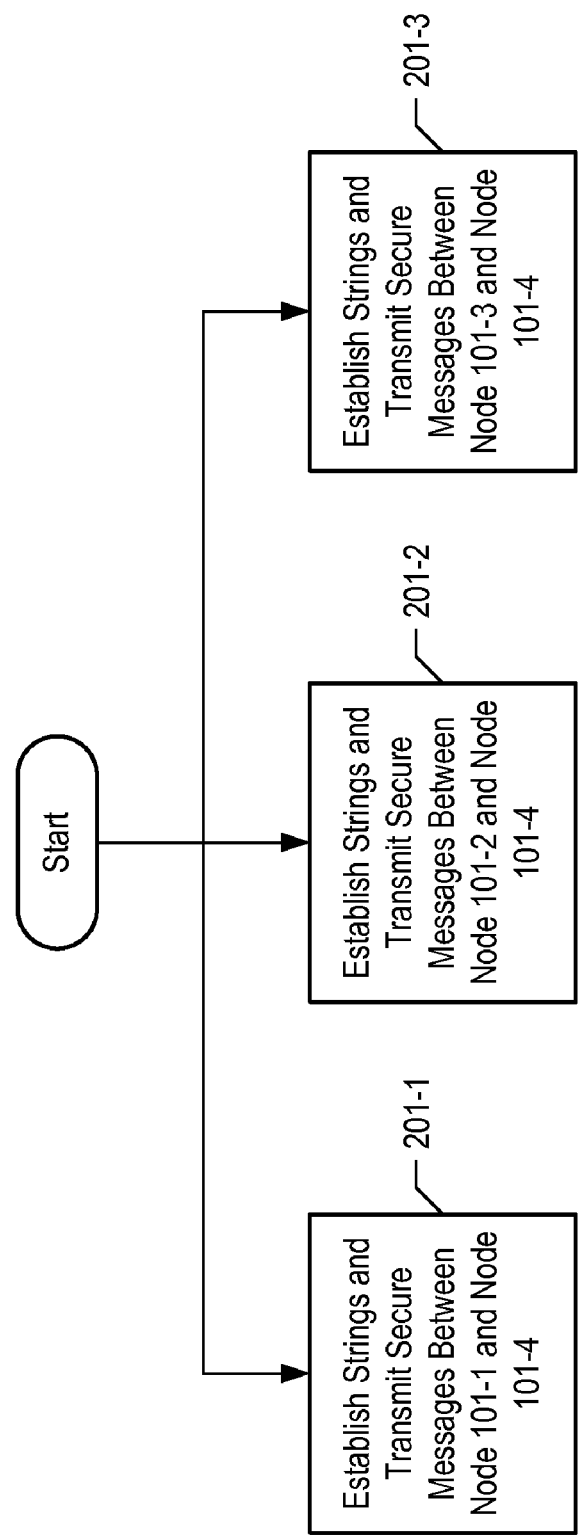
FIG. 2 depicts a flowchart of the salient tasks associated with the operation of the illustrative embodiment of the present invention.

FIG. 2 is a flowchart of the salient tasks associated with the operation of the illustrative embodiment of the present invention. In accordance with the illustrative embodiment, tasks 201-1, 201-2 and 201-3 are performed concurrently, but it will be clear to those skilled in the art, after reading this disclosure, how to make and use alternative embodiments of the present invention in which some or all of the tasks are performed serially or simultaneously. Furthermore, in accordance with the illustrative embodiments, the subtasks within tasks 201-1, 201-2, and 201-3 are performed serially so as to not overwhelm the computing capabilities of node 101-4, but it will be clear to those skilled in the art, after reading this disclosure, how to make and use alternative embodiments of the present invention in which some or all of the subtasks are performed concurrently or simultaneously.

At task 201-1, node 101-1 and node 101-4 establish a series of three progressively-more-secure strings of symbols and exchange secret and authenticated messages using those strings of symbols. This is described in detail below and in FIG. 3. Although node 101-1 and 101-4 establish a series of three secure strings of symbols, it will be clear to those skilled in the art, after reading this disclosure, how to make and use alternative embodiments of the present invention in which the series comprises any plurality of secure strings of symbols.

At task 201-2, node 101-2 and node 101-4 establish a series of three progressively-more-secure strings of symbols and exchange secret and authenticated messages using those strings of symbols. This is described in detail below and in FIG. 3. Although node 101-2 and 101-4 establish a series of three secure strings of symbols, it will be clear to those skilled in the art, after reading this disclosure, how to make and use alternative embodiments of the present invention in which the series comprises any plurality of secure strings of symbols.

At task 201-3, node 101-3 and node 101-4 establish a series of three progressively-more-secure strings of symbols and exchange secret and authenticated messages using those strings of symbols. This is described in detail below and in FIG. 3. Although node 101-3 and 101-4 establish a series of three secure strings of symbols, it will be clear to those skilled in the art, after reading this disclosure, how to make and use alternative embodiments of the present invention in which the series comprises any plurality of secure strings of symbols.

Figure 3:
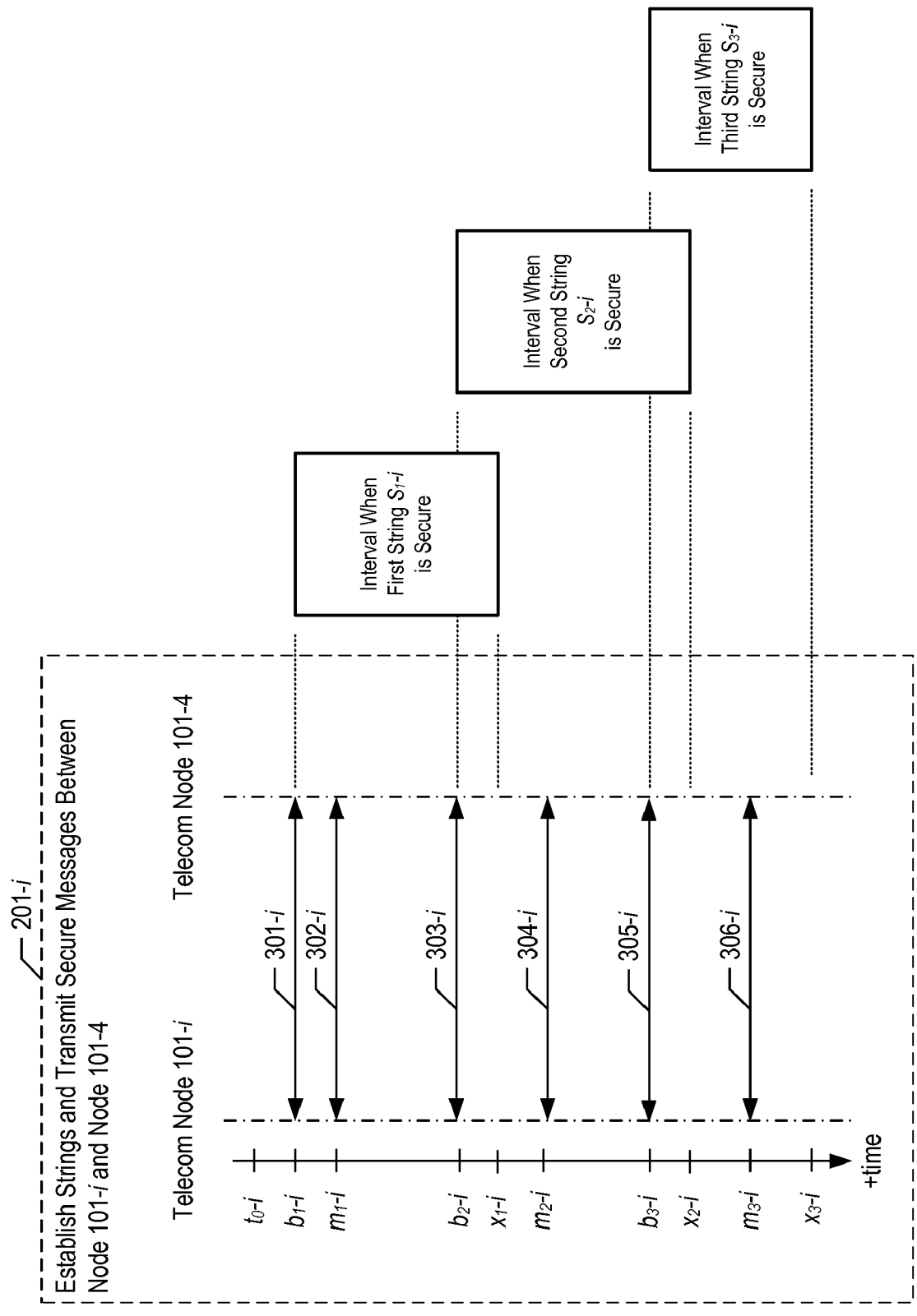
FIG. 3 depicts a flowchart of the salient tasks associated with the operation of task 201-i.

FIG. 3 is a flowchart of the salient tasks associated with the operation of task 201-$i$, where $i \in \{1, 2, 3\}$, involving node 101-$i$ and node 101-4. Task 201-$i$ begins, by definition, when node 101-$i$ is turned on, is re-booted, or for whatever reason is required to renew its secure strings. The beginning of task 201-$i$ is defined as instant $t_0$-i.

At task 301-$i$—which occurs at instant $b_1$-i—node 101-$i$ and node 101-4 establish a first-stage secure string of symbols $S_1$-i.

In accordance with the illustrative embodiment, the first-stage string $S_1$-i is chosen from a key space having $K_1$-i members, where $K_1$ is a natural number, using the well-known Diffie-Hellman key exchange protocol. It will be clear to those skilled in the art, after reading this disclosure, how to make and use alternative embodiments of the present invention in which another protocol is used to establish the first-stage string $S_1$-i (e.g., physically secure key exchanges, protocols based on the computational difficulty inherent in solving large numbers of puzzles, of factoring large numbers, of inverting large matrices, etc.).

In accordance with the illustrative embodiment, task 301-$i$ occurs at a different instant than all of the other tasks so as to not overwhelm the computing capabilities of node 101-4, but it will be clear to those skilled in the art, after reading this disclosure, how to make and use alternative embodiments of the present invention in which task 301-$i$ does, in fact occur concurrently with one or more other tasks. In any case, it will be clear to those skilled in the art how to make and use embodiments of the present invention that accomplish task 301-$i$.

At task 302-$i$—which occurs at instant $m_1$-i:
 i. node 101-$i$ transmits a first secure message to node 101-4 and uses the first-stage string $S_1$-i to secure the first message, and
 ii. node 101-4 transmits a second secure message to node 101-$i$ and uses the first-stage string $S_1$-i to secure the second message.

Although the illustrative embodiment uses symmetric-key or "classical" cryptography for encryption and authentication, it will be clear to those skilled in the art, after reading this disclosure, how to make and use alternative embodiments of the present invention in which asymmetric key or "public-key" techniques are used.

At task 303-$i$—which occurs at instant $b_2$-i—node 101-$i$ and node 101-4 establish a second-stage secure string of symbols $S_2$-i. In all cases, the second-stage string $S_2$-i is established before the first-stage string $S_1$-i expires (i.e., $b_2$-i<$x_1$-i).

In accordance with the illustrative embodiment, the second-stage string $S_2$-i is chosen from a key space having $K_2$-i members, where $K_2$ is a natural number that is larger than the key space of the first-stage string (i.e., $K_2$-i>$K_1$-i).

All other things being equal, the fact that the second-stage string $S_2$-i is chosen from a larger key space than the first-stage string $S_1$-i suggests that the second-stage string $S_2$-i is more secure than the first-stage string and can be used for a longer interval before it is likely to be broken. In accordance with the illustrative embodiment, the key spaces and the length of the intervals during which they are comparably secure are related by:

$$\frac{\ln(K_2)}{(x_2 - b_2)} > \frac{\ln(K_1)}{(x_1 - b_1)} \qquad \text{(Eq. 1)}$$

It will be clear to those skilled in the art, however, after reading this disclosure, how to make and use alternative embodiments of the present invention in which the key space of the second-stage string is smaller than the key space of the first-stage string (i.e., $K_2$-i<$K_1$-i) or in which they are identical (i.e., $K_2$-i=$K_1$-i).

In accordance with the illustrative embodiment, node 101-$i$ and node 101-4 use the well-known Diffie-Hellman key exchange protocol to establish the second-stage string $S_2$-i, but it will be clear to those skilled in the art, after reading this disclosure, how to make and use alternative embodiments of the present invention in which the nodes use another protocol to establish the second-stage string $S_2$-i (e.g., physically secure key exchanges, protocols based on the computational difficulty inherent in solving large numbers of puzzles, of factoring large numbers, of inverting large matrices, etc.).

In accordance with the illustrative embodiment, task 303-$i$ occurs at a different instant than all of the other tasks so as to not overwhelm the computing capabilities of node 101-4, but it will be clear to those skilled in the art, after reading this disclosure, how to make and use alternative embodiments of the present invention in which task 303-$i$ does, in fact occur concurrently with one or more other tasks. In any case, it will be clear to those skilled in the art how to make and use embodiments of the present invention that accomplish task 303-$i$.

At instant $x_1$-i first-stage string $S_1$-i expires because sufficient time has elapsed since instant $b_1$-i for a reasonably-skilled cryptanalyst could discover it. It will be clear to those skilled in the art how to determine when instant $x_1$-i occurs given $K_1$ and the technique used for generating the first-stage string $S_1$-i. In all cases, instant $b_1$-i occurs before instant $m_1$-i which occurs before instant $x_1$-i (i.e., $b_1$-i<$m_1$-i<$x_1$-i).

At task 304-$i$—which occurs at instant $m_2$-i:
 i. node 101-$i$ transmits a third secure message to node 101-4 and uses the second-stage string $S_2$-i to secure the third message, and
 ii. node 101-4 transmits a fourth secure message to node 101-$i$ and uses the second-stage string $S_2$-i to secure the fourth message.

Although the illustrative embodiment uses symmetric-key or "classical" cryptography for encryption and authentication, it will be clear to those skilled in the art, after reading this disclosure, how to make and use alternative embodiments of the present invention in which asymmetric key or "public-key" techniques are used.

At task 305-$i$—which occurs at instant $b_3$-i—node 101-$i$ and node 101-4 establish a third-stage secure string of symbols $S_3$-i. In all cases, the third-stage string $S_3$-i is established before the second-stage string $S_2$-i expires (i.e., $b_3$-i<$x_2$-i).

In accordance with the illustrative embodiment, the third-stage string $S_3$-i is chosen from a key space having $K_3$-i members, where $K_3$ is a natural number that is larger than the key space of the second-stage string (i.e., $K_3$-i>$K_2$-i).

All other things being equal, the fact that the third-stage string $S_3$-i is chosen from a larger key space than the second-stage string $S_2$-i suggests that the third-stage string $S_3$-i is more secure than the second-stage string and can be used for a longer interval before it is likely to be broken. In accordance with the illustrative embodiment, the key spaces and the length of the intervals during which they are comparably secure are related by:

$$\frac{\ln(K_3)}{(x_3 - b_3)} > \frac{\ln(K_2)}{(x_2 - b_2)} > \frac{\ln(K_1)}{(x_1 - b_1)} \quad \text{(Eq. 2)}$$

It will be clear to those skilled in the art, however, after reading this disclosure, how to make and use alternative embodiments of the present invention in which the key space of the third-stage string is smaller than the key space of the second-stage string (i.e., $K_3$-i<$K_2$-i) or in which they are identical (i.e., $K_3$-i=$K_2$-i).

In accordance with the illustrative embodiment, node 101-$i$ and node 101-4 use the well-known Diffie-Hellman key exchange protocol to establish the third-stage string $S_3$-i, but it will be clear to those skilled in the art, after reading this disclosure, how to make and use alternative embodiments of the present invention in which the nodes use another protocol to establish the third-stage string $S_3$-i (e.g., physically secure key exchanges, protocols based on the computational difficulty inherent in solving large numbers of puzzles, of factoring large numbers, of inverting large matrices, etc.).

In accordance with the illustrative embodiment, task 305-$i$ occurs at a different instant than all of the other tasks so as to not overwhelm the computing capabilities of node 101-4, but it will be clear to those skilled in the art, after reading this disclosure, how to make and use alternative embodiments of the present invention in which task 305-$i$ does, in fact occur concurrently with one or more other tasks. In any case, it will be clear to those skilled in the art how to make and use embodiments of the present invention that accomplish task 305-$i$.

At instant $x_2$-i the second-stage string $S_2$-i expires because sufficient time has elapsed since instant $b_2$-i for a reasonably-skilled cryptanalyst could discover it. It will be clear to those skilled in the art how to determine when instant $x_2$-i occurs given $K_2$ and the technique used for generating the second-stage string $S_2$-i. In all cases, instant $b_2$-i occurs before instant $m_2$-i which occurs before instant $x_2$-i (i.e., $b_2$-i<$m_2$-i<$x_2$-i).

At task 306-$i$—which occurs at instant $m_3$-i:
 i. node 101-$i$ transmits a fifth secure message to node 101-4 and uses the third-stage string $S_3$-i to secure the fifth message, and
 ii. node 101-4 transmits a sixth secure message to node 101-$i$ and uses the third-stage string $S_3$-i to secure the sixth message.

Although the illustrative embodiment uses symmetric-key or "classical" cryptography for encryption and authentication, it will be clear to those skilled in the art, after reading this disclosure, how to make and use alternative embodiments of the present invention in which asymmetric key or "public-key" techniques are used.

At instant $x_3$-i the third-stage string $S_3$-i expires because sufficient time has elapsed since instant $b_3$-i for a reasonably-skilled cryptanalyst could discover it. It will be clear to those skilled in the art how to determine when instant $x_3$-i occurs given $K_3$ and the technique used for generating the third-stage string $S_3$-i. In all cases, instant $b_3$-i occurs before instant $m_3$-i which occurs before instant $x_3$-i (i.e., $b_3$-i<$m_3$-i<$x_3$-i).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
 transmitting, at a telecommunications node, secure messages with a first encryption key comprising a first string of symbols for a first time interval from instant $b_1$ to instant $x_1$, wherein the first string of symbols is selected from a first key space having $K_1$ members, where $K_1$ is a natural number; and
 transmitting, at the telecommunications node, secure messages with a second encryption key comprising a second string of symbols for a second time interval from instant b₂ to instant $x_2$, wherein the second string of symbols is selected from a second key space having $K_2$ members, where $K_2$ is a natural number;
wherein $x_2 > x_1$;
wherein $b_2 > b_1$;
wherein $b_2 < x_1$; and
wherein $\ln(K_2)/(x_2-b_2) > \ln(K_1)/(x_1-b_1)$.

2. The method of claim 1 wherein $K_2 > K_1$.

3. The method of claim 1 wherein $K_2 < K_1$.

4. The method of claim 1 wherein $K_2 = K_1$.

5. The method of claim 1 further comprising transmitting, at the telecommunications node, secure messages with a third encryption key comprising a third string of symbols for a third time interval from instant $b_3$ to instant $x_3$, wherein the third string of symbols is selected from a third key space having $K_3$ members, where $K_3$ is a natural number; and
wherein $b_3 < x_2$; and
wherein $$\frac{\ln(K_3)}{(x_3-b_3)} > \frac{\ln(K_2)}{(x_2-b_2)} > \frac{\ln(K_1)}{(x_1-b_1)}.$$

6. The method of claim 5 wherein $K_3 > K_2 > K_1$.

7. The method of claim 5 wherein $K_3 < K_2 < K_1$.

8. The method of claim 5 wherein $K_3 = K_2 = K_1$.

9. A method comprising:
establishing a first string of symbols for a telecommunications node for a first time interval from instant $b_1$ to instant $x_1$, wherein the first string of symbols is selected from a first key space having $K_1$ members, where $K_1$ is a natural number;
transmitting a first message from the telecommunications node at instant $m_1$, wherein the first message is authenticated with the first string;
establishing a second string of symbols for the telecommunications node for a second time interval from instant $b_2$ to instant $x_2$, wherein the second string of symbols is selected from a second key space having $K_2$ members, where $K_2$ is a natural number; and
transmitting a second message from the telecommunications node at instant $m_2$, wherein the second message is authenticated with the second string;
wherein $b_1 < m_1 < x_1$;
wherein $b_2 < m_2 < x_2$;
wherein $x_2 > x_1$;
wherein $b_2 > b_1$;
wherein $b_2 < x_1$; and
wherein $\ln(K_2)/(x_2-b_2) > \ln(K_1)/(x_1-b_1)$.

10. The method of claim 9 wherein $K_2 > K_1$.

11. The method of claim 9 wherein $K_2 < K_1$.

12. The method of claim 9 wherein $K_2 = K_1$.

13. The method of claim 9 further comprising:
establishing a third string of symbols for the telecommunications node for a third time interval from instant $b_3$ to instant $x_3$, wherein the third string of symbols is selected from a third key space having $K_3$ members, where $K_3$ is a natural number; and
transmitting a third message from the telecommunications node at instant $m_3$, wherein the third message is authenticated with the third string;
wherein $b_3 < m_3 < x_3$;
wherein $b_3 < x_2$; and
wherein $$\frac{\ln(K_3)}{(x_3-b_3)} > \frac{\ln(K_2)}{(x_2-b_2)} > \frac{\ln(K_1)}{(x_1-b_1)}.$$

14. The method of claim 13 wherein $K_3 > K_2 > K_1$.

15. The method of claim 13 wherein $K_3 < K_2 < K_1$.

16. The method of claim 13 wherein $K_3 = K_2 = K_1$.

17. A method comprising:
encrypting messages at a telecommunications node with a first string of symbols for a first time interval from instant $b_1$ to instant $x_1$, wherein the first string of symbols is selected from a first key space having $K_1$ members, where $K_1$ is a natural number; and
encrypting messages at the telecommunications node with a second string of symbols for a second time interval from instant $b_2$ to instant $x_2$, wherein the second string of symbols is selected from a second key space having $K_2$ members, where $K_2$ is a natural number;
wherein $x_2 > x_1$;
wherein $b_2 > b_1$;
wherein $b_2 < x_1$; and
wherein $\ln(K_2)/(x_2-b_2) > \ln(K_1)/(x_1-b_1)$.

18. The method of claim 17 wherein $K_2 > K_1$.

19. The method of claim 17 wherein $K_2 < K_1$.

20. The method of claim 17 wherein $K_2 = K_1$.

* * * * *